United States Patent [19]

Baum et al.

[11] 3,851,581

[45] Dec. 3, 1974

[54] MANUFACTURE OF ELECTRICALLY HEATED WINDOWS

[75] Inventors: Hans Baum, Porz-Urbach; Ralf Reinicke, Porz-Zundorf; Dieter John, Porz-Eil, all of Germany

[73] Assignee: Saint-Gobain Industries, Neuilly S/Seine, France

[22] Filed: Mar. 8, 1973

[21] Appl. No.: 339,313

Related U.S. Application Data

[62] Division of Ser. No. 17,182, March 6, 1970, abandoned.

[30] Foreign Application Priority Data

| | | |
|---|---|---|
| Mar. 7, 1969 | Germany | 1911555 |
| Mar. 8, 1969 | Germany | 1911561 |

[52] U.S. Cl. ................ 101/129, 101/128.3, 96/36.4, 219/203

[51] Int. Cl. .................. B41m 1/12

[58] Field of Search .......... 101/128.3, 129; 96/36.4; 219/203, 543

[56] References Cited

UNITED STATES PATENTS

| | | | |
|---|---|---|---|
| 2,569,773 | 10/1951 | Orr | 219/543 |

FOREIGN PATENTS OR APPLICATIONS

| | | | |
|---|---|---|---|
| 609,659 | 1/1935 | Germany | 96/36.4 |
| 896,456 | 10/1953 | Germany | 96/36.4 |
| 1,209,777 | 10/1970 | Great Britain | 219/203 |
| 466,056 | 1/1969 | Switzerland | 101/128.3 |
| 317,782 | 12/1969 | Sweden | 219/203 |

*Primary Examiner*—David Klein
*Attorney, Agent, or Firm*—Pennie & Edmonds

[57] ABSTRACT

This invention involves a novel silk screen, a novel process of making it, and a novel use in the technology of heating flat bodies such as automobile and factory windows. The new screen is characterized by slits of differential width, depth, or both which permit the deposit of lines of differential section. This has a special significance when the lines are composed of electrical conductors of resistance type of which the resistivity of a part is determined by its section. The process involves a method of making the new type of silk screen which is extremely flexible and permits the construction of screens, the slits of which are differential only as to thickness. The invention has been achieved by a novel process which relies upon basic techniques already known to the silk screen art, such as the making of emulsions of proper conductivity for heating lines, the technique of preparing the emulsions, and the technique of dissolving those portions which must be removed to form the slits constituting the design. The invention also involves the novel windows which bear designs of differential resistivity producing different temperature in different parts. These advantages are particularly important in the automotive field but are equally so in factories where overhead windows can be kept clear to furnish light even during snowy weather. Other objects, novelties, and advantages of the invention will be apparent after the reading of this specification.

18 Claims, 1 Drawing Figure

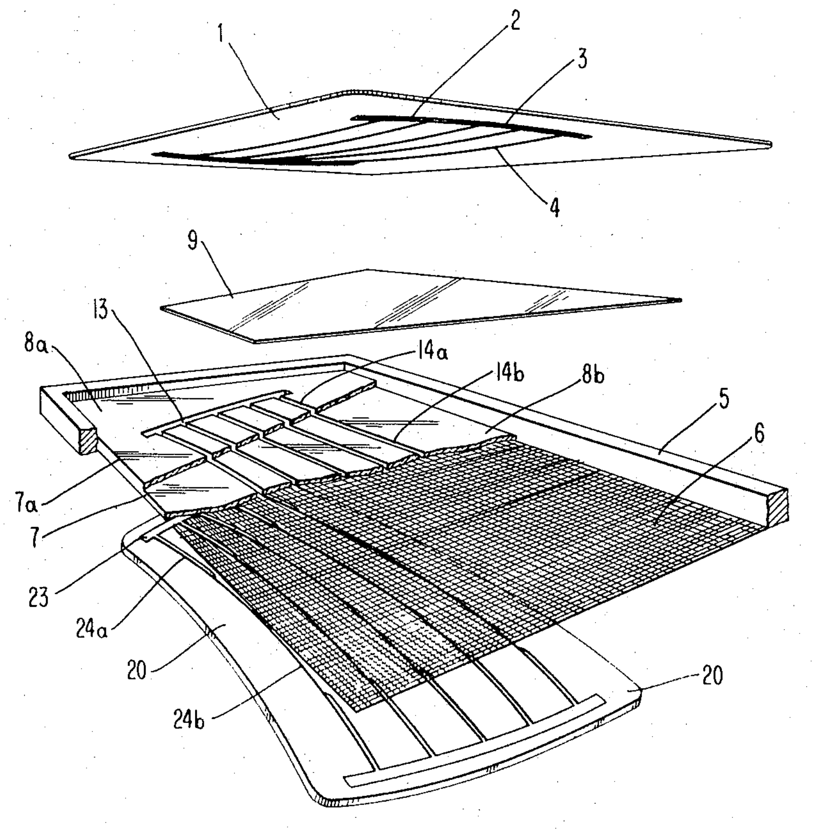
1
2
3
4
9
13
8a
14a
14b
8b
5
6
7a
7
23
24a
20
24b
20

MANUFACTURE OF ELECTRICALLY HEATED WINDOWS

This application is a division of application of the same inventors, Ser. No. 17,182 of Mar. 6, 1970 now abandoned.

The invention concerns the manufacture of an electrically heated window carrying on the surface of the glass linear resistance bands of metallic composition deposited by serigraphy and baked, which preferably presents in a certain zone of the field of vision a resistance per unit length higher than exists outside of that zone, in order to establish a principal field of vision with higher heating.

Among the types of known screens the direct photographic screen has shown such advantages that it is used practically exclusively today. In order to produce that screen a photosensitive film is deposited on a fine tissue. The design which is to be reproduced is than projected onto this film by exposure to light through a photographic transparency of full size that is placed in direct contact with the photosensitive layer. Luminous rays of short wave length expose the photosensitive layer with the exception of the masked parts, from which the emulsion is later removed with hot water to form the stencil. Heated windows of this type are used particularly in automobiles, to which they give good visibility by preventing the formation of condensate or ice, or by melting ice which has formed.

The resistance bands themselves should be sufficiently thin not to obstruct visibility. As a general rule they are about 0.4 mm. in width. In order for the heating network to be effective it should dissipate a power of about 4 watts per 100 square centimeters. Being given the voltages habitually available in automobiles this requires that a certain minimum of conductivity must be imparted to the strips, that is to say, a minimum per section. Heretofore it has not been possible to produce adequate sections by depositing the conductive strips through a silk screen because it was not feasible to increase the thickness of the strips while maintaining minimum width, as explained hereinabove, and because the silk screen technique did not permit the application of a layer of metallic ink of sufficient thickness with the necessary precision. This difficulty has been somewhat reduced by reinforcing the conductive strips by electroplating. Electrically heated windows of that type have been used as the rear windows of automobiles, e.g. as described in French Pat. No. 1,464,585, an increase of heat within the principal field of vision having simultaneously been obtained by increased thickening of the resistance strips, exterior to the principal field, by electroplating, which produces the differential conductivity desired. That process goes in several steps, first depositing a conductive ink including silver particles and vitreous frit on the glass; secondly baking it; thirdly, electroplating it in a double operation by depositing a conductive layer of copper, and covering it with a protective layer of nickel which improves the appearance but plays a secondary role as to conductibility.

A principal object of the present invention is to produce a heated window of this kind by eliminating the electrodeposited copper, which reduces the cost of manufacture. The elimination of the electrodeposited conductive layer also permits the elimination of the protective layer of nickel, although the use of the latter may be continued when advantageous. A heated window of the type described in this invention is therefore fundamentally distinguished in that it is provided with resistance bands which may be of any chosen design, e.g. approximately parallel, and which are usually less than 0.8 mm. and preferably about 0.6 mm. in width, and of which the conductivity is essentially due to a layer of metallic ink deposited in a single impression. According to a development of the invention, at least some of these bands present several zones of different heating effect between which the unitary difference of electrical resistance is obtained by establishing difference in section of the heating strips.

The invention has, therefore, as another object a silk screen photographic process which accomplishes the deposition of resistance strips of chosen, differing section in a single operation, producing the desired conductibilities by the sole use of printed lines. The screen achieving this result is preferably made by the successive deposition of several photosensitive layers one upon the other, the later being deposited after drying the earlier. Thus one makes the photographic screen as thick as required, so as to confer an increased depth to the grooves corresponding to the heating grid. This permits the deposition of the conductive paste to a thickness adequate to achieve the heating effect desired in a particular location. In general, the thickness of each layer deposited to build up the thickness of the screen should not exceed 50 $\mu$m.

In one mode the hardening by exposure to light through the transparency is carried out in one exposure after obtaining the selected total thickness of the film. This mode of execution is appropriate to the production of a photosensitive layer composed of a small number of superimposed strata; but if the total thickness exceeds a certain value, the absorption of light rays at the surface of the layer prevents the deeper layers from hardening properly. If it is desired to still further increase the total thickness of the layer, it is possible, according to another mode of the invention, to so operate that after depositing and drying a first layer composed of one or more strata and exposing this layer through the transparency, after washing and drying, a second analogous layer is deposited and exposed through the same transparency, taking care to superimpose the contours exactly, and so on layer by layer until one has achieved the desired thickness of film.

The screens produced by the process of the invention are particularly useful in the one-stroke manufacture of heated windows which have zones between which the resistance of the conductive lines per unit length varies, enabling the maker to manufacture windows of larger sizes than was heretofore practical because the larger part of the heating power is dissipated in particular zones, for instance that of the primary fields of vision. For this purpose the regions of the screen outside the principal field of vision are covered with a photosensitive layer of increased thickness, during manufacture, so that the thickness of the metallic paste is increased in the corresponding regions of the windows. During the manufacture of these screens the slits may be constructed with a width, inside the principal field of vision, which is smaller than their width outside the field.

The screens of the invention are constructed so that the slits provided for the passage of ink have a section proportional to the local conductibility desired in that portion of the window to which it is applied, varying from zone to zone as desired.

The invention provides several methods of producing a photographic image having the desired properties from transparency, sometimes called a model, having lines of constant width throughout its length, a construction which is highly desirable if one is to achieve without excessive difficulty the exactitude which is so necessary to a satisfactory result.

According to the first mode of the invention one produces a photographic screen having slits of identical width but different depth. In this mode it is the thickness of the photosensitive layer deposited upon the tissue which differs, being greater in the end regions than in the central portion which constitutes the main field of vision. When the ink is applied to the window through the stencil slits in the screen, the lines have a thickness corresponding to the contiguous portions of the slits. The process may thus be carried out in a single step, the sensitive emulsion being laid upon the tissue as a stratum or as strata of different thickness. The thickness thus provided can be increased only within rather strict limits so that the flexibility of this mode is not the greatest.

To vary the thickness of the sensitive layer within larger limits, it is within the contemplation of the invention to deposit several strata one after the other, each time after having dried the preceding strata. In this method of making the screen the thickness of the sensitive layer can be increased at will but, because of the absorption of light in the upper thickness, too great a thickness will not harden at the bottom. To avoid this difficulty one deposits several photosensitive layers one upon another but with exposure to light between deposits, developing them in turn. During the exposure of each successive layer the transparency should be returned to its place on the screen with precision so as to conform exactly to the pattern. The process can then be repeated until the screen has received the desired thickness.

To produce an image having bands of variable width, another mode is used according to the invention in which a transparency is employed which has opaque lines of constant width but, to reduce the width of the lines in the principal field during the fixation of the sensitive layer, the lines in the principal field are either exposed longer to the light or are exposed to more intense light. The operation of this process appears to derive from the fact that as the exposure is increased a larger quantity of light diffuses along the edges of the lines masked by the transparency, which allows the hardening of the photosensitive layer even into the edges of the masked areas. By selecting the quantity of exposure it is possible to change the degree to which the lines are progressively reduced in size within their given limits. If it is desired to produce a greater reduction of size of the lines than can be obtained by a variation of the quantity of exposure, one may, within the scope of the invention, interpose a transparent, thin interlayer between the transparency and the sensitive layer during the exposure and thus provide that the lines of the transparency which interrupt the light are somewhat removed from the sensitive layer so that some of the rays of light are diverted into the masked area. By choosing the thickness of the interlayer it is possible to impart selected width to the lines in the regions affected at will and with great precision.

It is also to be understood that the several modes discussed above may be combined one with another, which permits greater variation and distribution of resistivity according to a preconceived plan.

The single FIGURE of the drawing schematically illustrates, in perspective, without respecting proportions, the manufacture of a heated window in accordance with the best mode of the invention.

The model of the heating grid to be applied to the windows is laid out on a transparency 1 as an opaque grid 2 which includes the two bus bands 3 connected by thin parallel lines 4 of uniform width. A frame 5 holds a nylon taffeta tissue 6 which is provided with a first photosensitive layer 7 and also, in a zone **8*a* which is outside the principal field of vision, with a second photosensitive layer 7*a*. A transparent insert 9 is laid upon the screen so as to cover the zone 8*b* which corresponds to the principal field of vision. The transparency 1 is placed upon the insert 9 and the screen is exposed to ultraviolet rays and developed in the way which has been described hereinabove. The grid 2 is thus transferred to the screen which has the appearance schematized in the figure. The stencil plate is thus made impermeable to the metallic ink except in those zones which were masked by the grid 2, 3, 4, during the exposure to ultraviolet, of which lines 13 correspond to lines 3 and lines 14 correspond to lines 4. After the exposed plate has been washed with hot water it becomes a stencil attached to the silk, and the lines 13 and 14 appear as slits free of emulsion, shallow in the median region 8*b*, and deeper in the end region 8*a*. Because of the warping of light by the insert 9 the intermediate parts 14*b* of the slits 14 are thinner than the parts 14*a*. The screen is now ready for use in applying the conductive lines to an automobile windshield 20. The frame 5 is lowered until the silk screen is in accurate position on the surface of the windshield and the slits 13 and 14 are completely filled with ink by strokes of the doctor blade (not shown) which serves to apply the ink to the glass through the screen. In this way the sections of the conductive heating lines on the windshield vary from one part to another of their length. This produces bus bands 23 connected by parallel heating lines 24 of which the section is greater at the ends 24*a* than in the midportions 24*b* resulting, during the flow of current from the automobile battery, in the development of the highest temperature in the portions 24*b*, a lower temperature in 24*a*, and a least temperature in the bus bands 23, it being observed that the bus bands are illustrated as of greater section than the portions 24*a* which are in turn of greater section than portions 24*b*** of the grid.

This produces the highest temperature in the main field of vision in the center of the windshield, a median temperature toward the ends of the windshield, and a least temperature adjacent the bus bands.

EXAMPLE 1

A silk (nylon) tissue of 120 threads per centimeter is mounted on a frame in the usual way and a photosensitive emulsion of standard type is deposited on it by any known technique. For such techniques and such emulsions, works on the silk screen can be consulted. The emulsion is dried. The transparency, carrying lines 0.4 mm. wide arranged in the size and pattern desired on the face of the window, is laid on the screen. The screen is exposed for 2 minutes to uniform illumination from an ultraviolet projector of 180 W. situated at a distance of 1.2 m. The whole of the surface except the principal field of vision is covered with an opaque mask. The principal field of vision is re-exposed for 2 minutes to the action of light, thereafter the screen is treated as customary, for instance removing the lines with hot water.

When this screen is used for the printing of glass sheets, as described above, the resistance lines, in the principal field of vision, have a width of approximately 0.3 mm. and in the remainder of the screen a width of 0.4 mm. The corresponding value of the electrical resistance of each conductor is 5Ω/dm. within the principal field and 4Ω/dm. outside of it.

EXAMPLE 2

Preparing a silk screen in the usual way, for instance as in Example 1, but placing a transparent sheet having a thickness of 0.1 mm. between the photosensitive surface and the transparency, an exposure of 3 minutes, and washing in hot water, produces a silk screen which has lines 0.3 mm. wide in the principal field and 0.4 mm. wide outside of it.

EXAMPLE 3

On the silk tissue of Example 1 a first photosensitive emulsion is deposited by the use of a doctor blade of the usual type. This layer is hardened in the usual way and upon it is superimposed a second emulsion, which is hardened, and then a third. After hardening and drying the third stratum, the total thickness of the photosensitive layer is about 100 μm. The transparency has a design of which the lines have a width of 0.4 mm. after exposure and formation of the slits by solution in hot water. The screen was used to mark a window, producing lines 0.4 mm. wide which, after baking, had a thickness of 20 μm. The resistance of these lines, when employing a standard composition of commerce as described in the first part of this application, had a value from 1 to 1.5 Ω/dm.

EXAMPLE 4

A silk screen is made according to Example 1 but, after removal of the transparency and development, the screen is again coated with three successive layers of emulsion and then exposed, attention being paid to obtaining exact superimposition of the transparency after each layer has been applied. After development the screen produced resistance lines, after baking, having a thickness of 30 μm., the resistance of which fill to 1 Ω/dm.

EXAMPLE 5

A silk screen is made as in Example 1 and after exposure, washing and drying of the first photosensitive layer, a second photosensitive emulsion layer is deposited, in the region of the principal field of vision only, in a very thin and uniform layer. In the other regions of the screen a considerably thicker stratum is applied. In order to carry this out and to produce a layer of equal thickness one may employ a toothed plate of which the feet are on the lower surface and of the dimensions desired in the layer. This permits the production of a layer which is precise in its dimensions. After drying that stratum the transparency is put in place in exact register and exposure takes place. The parts not exposed are eliminated by washing and the silk screen is finished in the usual way and is used to produce resistance bands having a thickness in the principal field of 17 μm. and an electrical resistance of 2.3 Ω/dm., while in the regions the thickness is 30 μm. and the resistance less than 1 Ω/dm.

EXAMPLE 6

A silk screen is prepared as in Example 1 and upon the first photosensitive layer is deposited a new photosensitive layer of uniform thickness limited to the principal field of vision, and thicker layers in the regions outside of it. The second layer is dried. After drying, the photosensitive emulsion is about 60 μm. thick in the principal field and about 100 μm. in the secondary zones. The transparency is placed upon this screen, the design having lines 0.4 mm. wide. Exposure to ultraviolet light was as in Example 1 and the design is developed by washing with hot water. The reproduction of this design on glass sheets through this screen produced resistance lines which, after baking, had a thickness of 12 μm. in the principal zone and of 20 μm. outside it. Their width remained at 0.4 mm., their resistance was 3.4 Ω/dm. in the principal field and 1.5 Ω/dm. in the remaining parts.

EXAMPLE 7

A silk screen was made by the process described in Example 6. After exposure, rinsing and drying, a new emulsion stratum of equal thickness in the central zone and thicker in the other zones was deposited. After drying the same transparency was put in place and after a new exposure to light the design in the screen was formed in the usual way and the plate was washed and dried. This screen deposited conductive bands which, after driping, had a thickness of 17 μm. and a corresponding resistance of 2.3 Ω/dm. in the principal field and of 30 μm. and 1 Ω/dm. outside of it.

This invention involves a novel silk screen, a novel process of making it, and a novel use in the technology of heating flat bodies such as automobile and factory windows. The new screen is characterized by slits of precisely differential width, depth, or both which permit the deposit of lines of differential section. This has a special significance, as the lines are composed of electrical conductors of resistance type of which the resistivity of a part is determined by its section. The process involves a method of making the new type of silk screen which is extremely flexible and permits the construction of screens the slits of which are fine lines differential mainly as to a stepped thickness, and differential additionally as to width if desired. The improvement has been achieved by a novel process which relies upon basic techniques already known to the silk screen art, such as the making of conductive silver pastes of proper conductivity for heating lines, the technique of preparing the photosensitive resin emulsions which coat the stencils, and the technique of dissolving those portions which must be removed to form the slits constituting the design. The invention also involves the novel windows which bear designs of differential resistivity producing different temperatures in different parts. These advantages are particularly important in the automotive field but are equally so in factories where overhead windows can be kept clear to furnish light even during snowy weather.

As many apparently widely different embodiments of the present invention may be made without departing from the spirit and scope thereof, it is to be understood that the invention is not limited to the specific embodiments.

What is claimed is:

1. A method of making a silk screen comprising a tissue and a stencil which comprises applying the emulsion to the tissue in differential thickness according to a preconceived design, and exposing the emulsion to radiation of short wave length through a transparency having opaque lines, dissolving away the areas beneath the lines and thereby making a stencil of which the slits are of differential depth conforming to the design.

2. A method according to claim 1 in which the differential depth of slit is achieved by applying the emulsion to the tissue in a series of layers of about equal thickness and different area, thereby making a stepped construction.

3. A method according to claim 2 in which the emulsion is applied as a series of layers each of which is exposed to the light prior to the application of the succeeding layer.

4. The process according to claim 1 in which increased thickness of the emulsion is achieved in particular areas by limiting the application of a layer to such areas.

5. Process for the manufacture of a silk screen according to claim 2 which comprises applying one of a series of layers to the tissue, masking a part of the surface of the forming stencil, and applying additional layers outside the mask.

6. A method according to claim 2 which has the addition, to the steps of forming the photosensitive layer of thickness varying according to design, the steps of interposing a transparent blank between the photosensitive layer and the transparency of linear design, and exposing the photosensitive layer through the transparent blank.

7. A method according to claim 2 which includes the steps of applying a photosensitive layer of not more than 50 $\mu$m. in thickness, exposing and hardening such layer, applying another similar layer thereto, and exposing and hardening the similar layer.

8. A method according to claim 6 in which the transparent blank is on the order of 0.1 mm. thick.

9. A method according to claim 2 in which the whole, completed screen is exposed, a portion of the screen is blanked off and the remaining portion is again exposed, producing a difference in the width of the slits upon development of the screen.

10. A method of making a silk screen comprising tissue and stencil which comprises applying a photosensitive emulsion to the tissue and shaping different areas thereof to different thickness, applying thereto a transparency having a pattern of fine and coarser opaque lines, portions of the fine lines of which overlie parts of areas of different thickness, exposing the emulsion through the transparency, and washing away the parts of the emulsion to form the stencil.

11. A method according to claim 10 in which the areas of different thickness consist of a different number of parallel layers of approximately equal thickness, each not greatly exceeding 50 $\mu$m.

12. A method according to claim 11 in which at least one of the lines of the transparency is of substantially equal width along its length and on the order of about 0.6 mm. wide.

13. A method according to claim 12 which includes the step of exposing the emulsion through a transparent blank for a duration chosen to produce in the stencil lines a selected width on the order of 0.3 to 0.4 mm.

14. A method of making a thermal window which comprises forming a serigraphic screen comprising a stencil of predetermined variable thickness having slits therethrough each traversing portions thereof of different thicknesses, applying the screen to a sheet of glass, forcing metallic, electrically conductive resistance ink through the screen at said slits against the glass sheet, the amount thus applied to the sheet at any location being determined in part by the depth of the slit at such location, withdrawing the screen, and treating the stencilled glass sheet to harden the ink.

15. A method of making a thermal window according to claim 14 wherein the stencil is made by applying a film of photosensitive emulsion to an ink-permeable tissue, hardening said film, successively applying and hardening additional photosensitive films above the first film to effect the predetermined variable thickness of the stencil, masking predetermined portions of the applied films, applying light to the unmasked portions of the emulsion film, and removing the masked portions of the film to form said slits.

16. A method of making a thermal window having a differential of heat to be developed over the surface of the window, said method comprising the steps of coating a tissue with a photosensitive film having a thickness differing according to said differential, exposing said film to radiation through a transparency having opaque lines, dissolving away the photosensitive film beneath the lines to produce a stencil of which the slits are of differential depth, applying the stencil to the window, forcing a metallic resistance ink through the slits against the window, withdrawing the stencil leaving the ink adherent to the glass in lines of differing depth, and hardening the ink.

17. A method according to claim 16 in which at least part of the slits of the stencil have parallel sides and differential depth.

18. A method according to claim 17 in which a part of the stencil slits have varying width and varying depth.

* * * * *

PO-1050
(5/69)

UNITED STATES PATENT OFFICE

CERTIFICATE OF CORRECTION

Patent No. 3,851,581 Dated December 3, 1974

Inventor(s) Hans Baum et al.

It is certified that error appears in the above-identified patent and that said Letters Patent are hereby corrected as shown below:

Column 1, line 19, for "than" substitute --then--.
Column 2, line 21, for "later" substitute --latter--.
Column 4, line 31, for "region" substitute --regions--.
Column 6, line 34, for "driping" substitute --drying--.
Column 7, line 30, for "the" substitute --in--.

Signed and sealed this 13th day of May 1975.

(SEAL)
Attest:

RUTH C. MASON
Attesting Officer

C. MARSHALL DANN
Commissioner of Patents
and Trademarks